July 12, 1932.  H. A. SNIVELY  1,867,388
CLOTHES DRIER
Filed Sept. 28, 1929  2 Sheets-Sheet 1
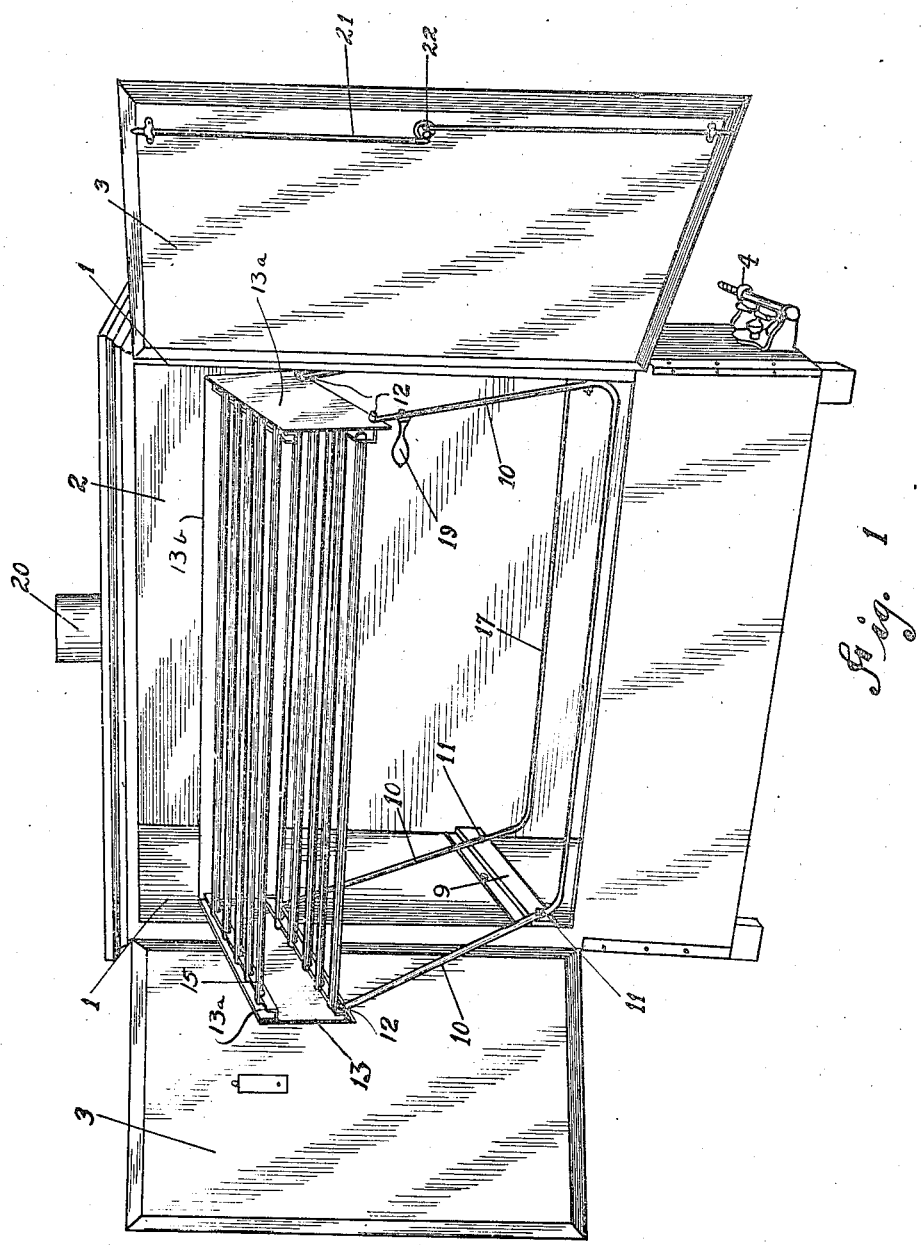
INVENTOR.
BY
ATTORNEY.

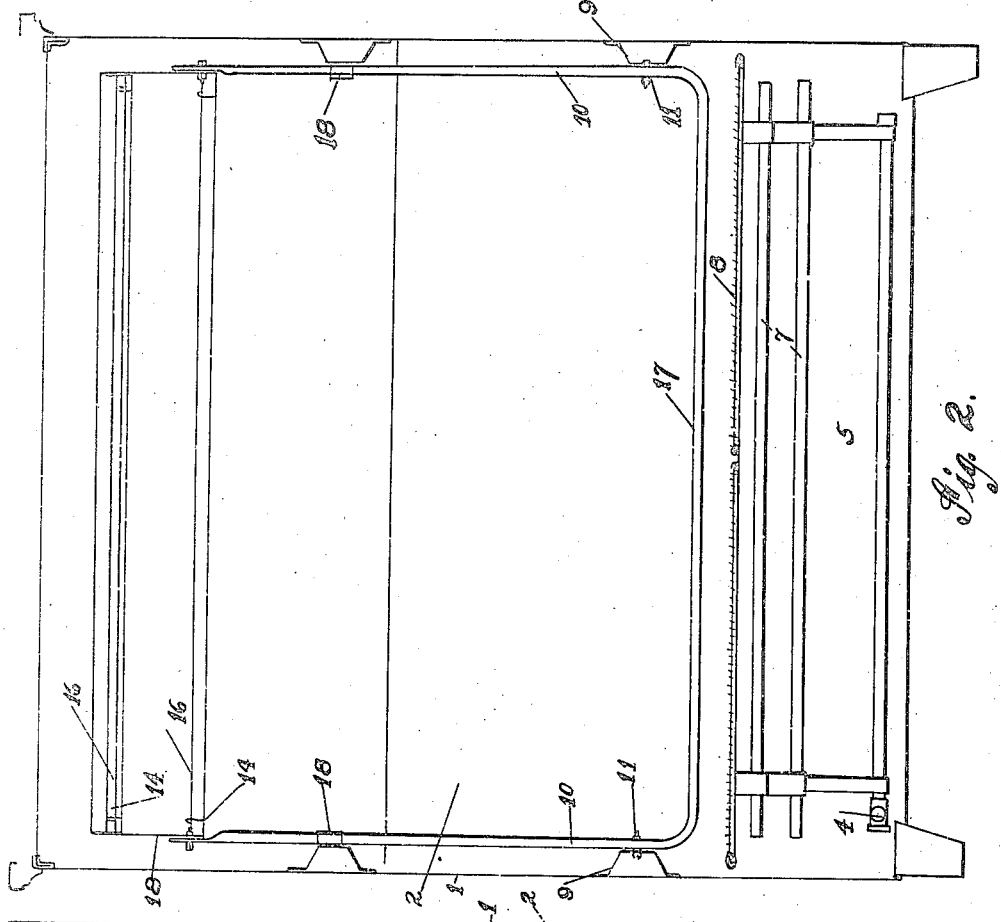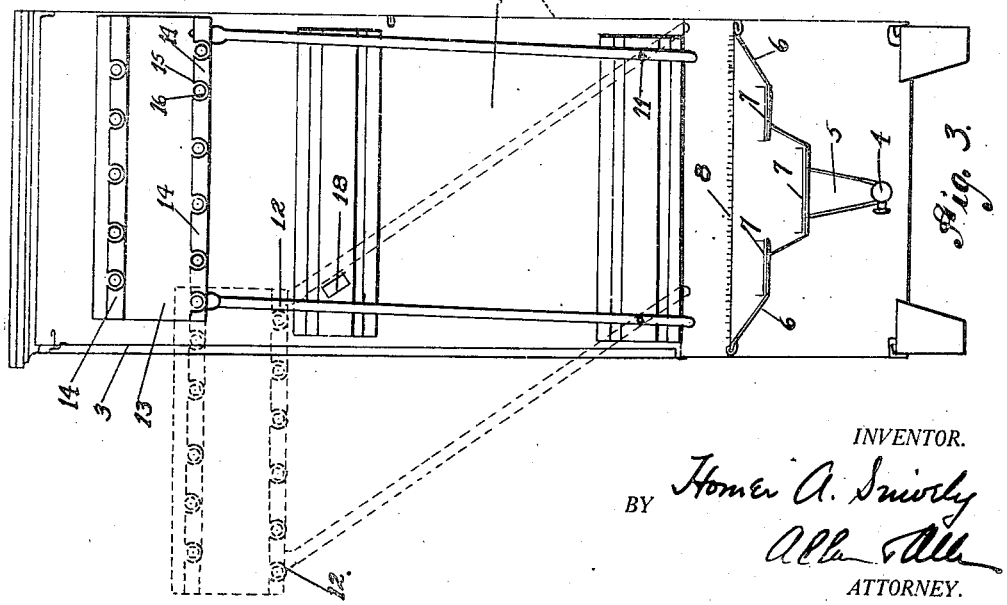

Patented July 12, 1932

1,867,388

UNITED STATES PATENT OFFICE

HOMER A. SNIVELY, OF COVINGTON, KENTUCKY

CLOTHES DRIER

Application filed September 28, 1929. Serial No. 395,933.

My invention relates to clothes driers of the cabinet type, and particularly to such driers as are provided with a heating device contained within the structure of the drier.

In a cabinet type clothes drier it is my object to provide a casing having doors which open so as to expose the entire area within the casing, and to mount drying racks for movement from within the casing to a position exteriorly thereof in which an operator can place clothes thereon and remove them with ease and facility.

It is another object of my invention to provide pivotally mounted supporting brackets which are suitably reinforced so that when an operator pushes in or draws out on one end of the rack the rack will not tend to cant and become wedged sideways within the cabinet.

A still further object of my invention is the provision of a clothes drier in which there is a removable drying rack having bars which are removable from the rack so that desired spacings for different types of articles to be dried may be obtained.

The above objects and other structural improvements in cabinet driers to which reference will be made in the ensuing specification I accomplish by that certain combination and arrangement of parts of which I have shown a preferred embodiment of my invention.

Referring to the drawings:

Figure 1 is a perspective view from in front of the cabinet with the doors open and the dry rack in position exteriorly of the cabinet accessible for hanging clothes on the rack bars.

Figure 2 is a diagrammatic side elevation showing the drier structure.

Figure 3 is a diagrammatic end elevation of the assembly shown in Figure 2.

The cabinet consists of a casing having side walls 1, a back wall 2, and hinged doors 3 which, when opened, expose the full interior of the cabinet. I have shown a gas burner 4 which enters the lower part of the casing in the heating chamber 5. In order to provide good circulation for the heated air, and at the same time to prevent direct exposure of garments being dried to the flames, I have provided brackets 6 suspended from the walls of the casing and I have mounted on the brackets a series of baffles 7 within the heating chamber to spread out the currents of heated gas. At the top of the heating chamber I have mounted a foraminated screen 8 which will prevent any articles falling off the dry racks from being ignited by the gas fire within the heating chamber.

Extending across the ends of the cabinet I have mounted channeled members 9. The U-shaped supporting brackets 10 for the dry rack have their side bars 10 pivotally connected to the channeled members 9 as indicated at 11. At the top the bars 10 are connected by pivots 12 to the dry rack frame 13. The dry rack frame has end pieces 13a with a connecting back plate 13b. The end pieces have upper and lower channeled supporting ledges 14. Spaced notches 15 in the supporting ledges demountably support the rack bars 16.

The dry rack frame is considerably reinforced by means of the connecting back plate 13b, and I have further found that unless the ends of the bars 10 are extended down beyond the pivot points 11, and unless the opposite ones are fixed together, the rack will have a tendency to cant and become wedged sideways within the cabinet. The transverse bars 17 connecting the side bars 10 provides a construction which is at the same time inexpensive to make a very strong and rigid.

To limit the outer movement of the dry rack when the rack is withdrawn from the cabinet, I have provided blocking members 18 which the bars 10 strike against at their outer limit of movement. In order to provide means for readily removing the rack, I have mounted a handle 19 to one of the bars 10. At the top of the cabinet I have shown a ventilating duct 20, and for locking the doors in closed position I have provided a pair of lock bars 21 which are eccentrically mounted on a rotatable shaft 22 which may be rotated by a handle mounted exteriorly of the cabinet.

To use the drier the gas flame is properly adjusted, the doors are opened, and the drying rack moved to its exterior position. Garments or articles to be dried are then placed on the rack bars which, being readily removable, enable desired spacings between the bars to be made. The rack is then moved back into the casing, the doors are closed, and the drying operation carried out in the usual manner.

Having thus described my invention, what I claim as new and desire to secure by Letters Patent, is:—

1. A support, a drying rack having a carrying frame pivoted at its base on said support for enabling the rack to be swung from within a drying compartment to exposed position exteriorly thereof, said drying rack comprising a frame composed of end supports with a connecting support and rack bars in tiers set in channels on said end supports.

2. A drying rack having pivoted bars for supporting said rack in such position in a compartment as will permit the movement of the drying rack from a position completely enclosed in the compartment to a position in which said rack is exposed exteriorly of said compartment, pivot means for said rack intermediate the ends of said pivoted bars, means bracing said pivoted bars comprising bars extending across said compartment and connecting the lower ends of said pivoted bars, and a support for said pivot means.

3. A clothes rack having means for pivotally mounting said rack so as to permit its arcuate movement from a position enclosed within said compartment to a position exposed exteriorly thereof, said rack comprising end supports with a cross brace extending between ends of said end supports free to rotate therewith, and said pivotally mounting means comprising upright bars having integrally formed braces extending across between the lower ends of said bars.

4. A tiltable rack comprising an upper substantially horizontal U-shaped member with its cross piece at the rear and its forwardly projecting side parts having supports for removable rack bars, and two upstanding U-shaped members with the upper parts of their sides pivoted to the respective side parts of the horizontal member near the front and the rear, repectively, a support, and pivots connecting said support to the respective sides of the upstanding members near their bottoms, the cross pieces of the several U-shaped members, rigidly joining the side thereof, preventing canting of the rack as it is swung forwardly and rearwardly on its lower pivots.

5. A tiltable rack comprising an upper substantially horizontal member of U-shape with its cross piece at the rear, said cross piece and the forwardly projecting side parts being of substantial vertical width, elements projecting inward from the inner surfaces of said side parts, one above the other on each side part and elongated from front to rear, said elements having notches in their tops, rack bars removably resting their ends in said notches, two upstanding U-shaped members with the upper parts of their sides pivoted to the respective side parts of the horizontal member near the front and rear, respectively, a support, and pivots connecting said support to the respective sides of the upstanding members near their bottoms, the cross pieces of the several U-shaped members, rigidly joining the sides thereof, preventing canting of the rack as it is swung forwardly and rearwardly on its lower pivots.

HOMER A. SNIVELY.